3,123,726
ULTRASONIC VIBRATION CONTROL OF THERMIONIC DEVICES

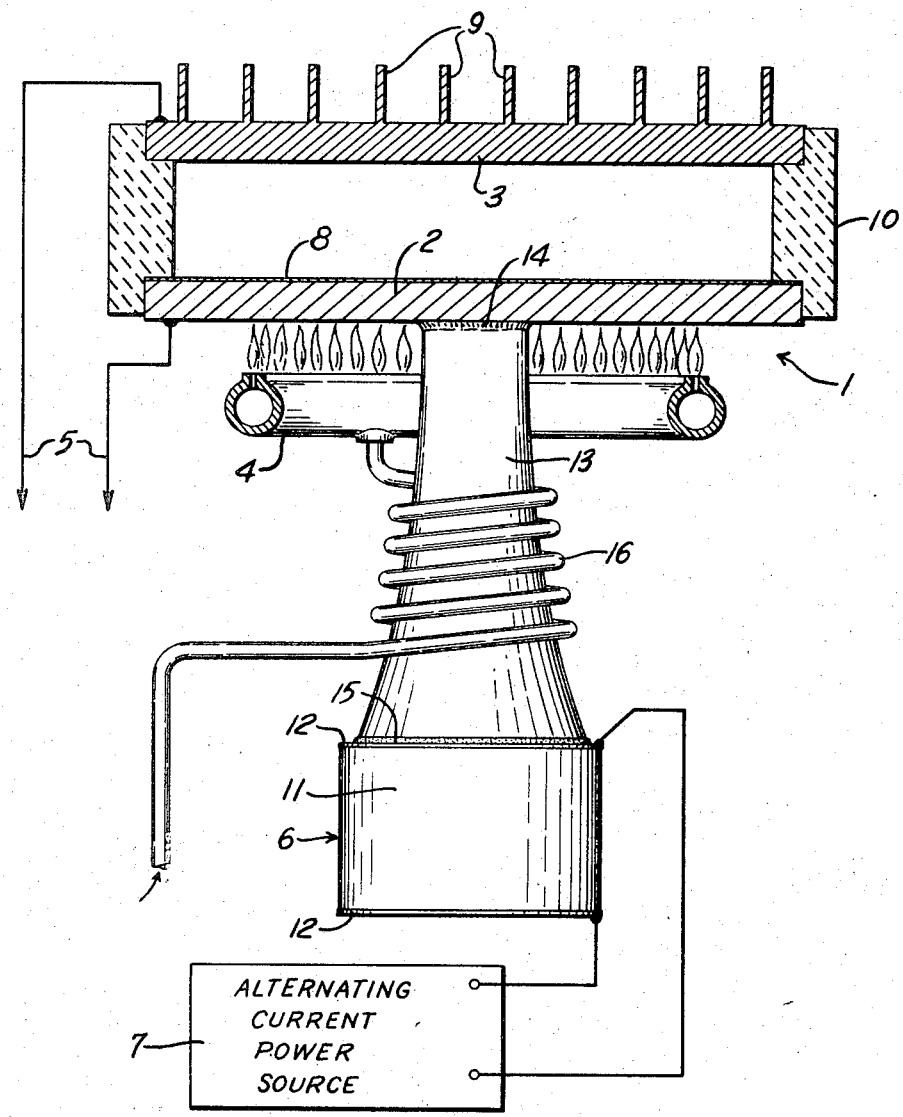

John T. Maynard, West Allis, Wis., assignor to A. O. Smith Corporation, Milwaukee, Wis., a corporation of New York
Filed Sept. 28, 1960, Ser. No. 58,991
3 Claims. (Cl. 310—4)

This invention relates to ultrasonic vibration control of thermionic devices and particularly to establishment of ultrasonic vibrations in the cathode to control and regulate the emission of electrons from the cathode surface.

Thermionic devices provide a direct conversion of heat energy to electrical energy and generally include an anode and a cathode mounted in spaced relation within a suitable enclosure. The cathode is selected to readily emit electrons from a cathode surface which may include a special coating of a high emission material. The temperature of the cathode is increased to effect the release of electrons at the cathode surface. The electrons collect on the anode due to charge phenomena and by connecting the cathode and the anode in a circuit, the thermionic device forms a current generator. Thermionic devices have generally been inefficient and impractical energy converters. In accordance with known theory, electrons emitted from the cathode must overcome the work function or potential barrier at the surface of the cathode as well as the space charge which is established adjacent the cathode. Practical electron emitting materials at the cathode surface may develop hot spots or concentrated localized areas of electron emission which rapidly destroy the cathode.

In accordance with the present invention, an ultrasonic vibration source is coupled to the cathode and establishes phonon waves in the cathode. There is an effective reduction of the cathode work function which increases the electron flow, apparently due to internal phonon-electron collisions of either elastic or umklapp processes. The thermal efficiency of the apparatus is thereby substantially increased.

In accordance with another aspect of this invention, the power output is readily controllable by controlling the ultrasonic vibration. The response is practically instantaneous and thereby provides a ready means of regulating the electrical energy output.

The drawing furnished herewith illustrates the best mode presently contemplated for carrying out the invention.

The drawing is an elevational view partly in vertical section through a thermionic generator illustrating a preferred construction of the present invention.

Referring to the drawing, a thermionic converter 1 includes a cathode 2 and an anode 3 mounted or arranged in slightly spaced relation. A heat source 4 is mounted adjacent the cathode 2 and constitutes an input energy source. As the temperature of the cathode 2 increases, the vibration of the atoms and molecules at the cathode surface facing the anode 3 results in the emission of electrons which flow to the anode 3. Electrical output leads 5 are connected respectively to the cathode 2 and to the anode 3 for connecting the electrical output established incident heating of the cathode 2 into a utilization circuit. In accordance with the present invention, an ultrasonic vibrator 6 is coupled to the cathode 2 to establish ultrasonic vibration waves with the cathode 2. A power source 7 is connected to the ultrasonic vibrator 6 to establish the desired ultrasonic vibration waves.

The illustrated converter 1 includes a cathode 2 which is formed of any suitable material; for example, as disclosed in a copending application entitled Means for Close Placement of Electrode Plates in a Thermionic Converter, filed September 14, 1959, with Serial No. 839,702 and assigned to a common assignee herewith. As more fully disclosed therein, a metal, metal oxide or a "Ceremet" emitter having good thermionic emission properties and which remains in a solid state at operating temperatures of approximately up to 4000 degrees K. is particularly satisfactory. A surface coating 8 which may be formed of a crystal complex of barium oxide and strontium oxide or the like is often applied to the cathode 2 to increase the normal electron emission of the cathode due to the heating of the cathode by the heat source 4.

The anode 3 is generally a plate-like member complementing the configuration of the cathode 2 and formed of any suitable metal such as nickel which serves to collect the electrons emitted by or from the surface of the cathode 2.

Cooling fins 9 are integrally formed on the back side of the anode 3 to prevent heating of anode 3 and thereby maintain maximum operating efficiency of the converter 1. If anode 3 increases in temperature, electrons are emitted from its surface and the net current in the output circuit is correspondingly reduced. By maintaining the anode 3 at a relatively low temperature, the effect of anode emission is minimized.

A peripheral seal 10 of suitable insulating material encircles and seals the periphery or the space between the cathode 1 and the anode 2. The seal 10 is preferably a ceramic or the like which has a low thermoconductivity and minimizes the transmission of heat from the heated cathode 2 to the anode 3.

Satisfactory materials which can be employed for seal 10 are aluminum oxide, silicon or quartz.

The heat source 4 is illustrated as an annular gas burner which is connected to any suitable source of gas, not shown. The heat source 4 constitutes a source of input energy for generally uniformly increasing the temperature of the cathode 2 to a level whereby electrons are freely emitted from the surface 8 of the cathode. Normally, the cathode temperature increases to above 1000 degrees K. and by the use of suitable high temperature sources may be increased to 4000 degrees K.

Emitted electrons are collected by the anode 3 and consequently an electromotive force builds up between the cathode 2 and the anode 3. The output leads 5 can be connected to any suitable electrical load, not shown, to supply power thereto.

The ultrasonic vibrator 6 is diagrammatically illustrated as including a cylindrical piezoelectric transducer 11 formed of a suitable material such as barium titante. A thin conducitve layer 12 of silver or the like is plated or otherwise disposed on the end faces of the transducer 11 to provide electrical connecting plates which are connected to a suitable varying power supply such as alternating current power source 7. The transducer 11 includes ferroelectric domains, not shown which tend to align with the electric field established by the power source 7. By rapidly reversing the polarity of layers 12, the length of the transducer changes with the reversing electric field and thereby creates a mechanical ultrasonic vibration. The natural or resonant frequency of the transducer 11 is selected to correspond to the frequency output of the generator 11.

A velocity transformer horn 13 connects one end of the transducer 11 to the underside of the cathode 2. Horn 13 is formed of a suitable high melting point metal and is welded or brazed at the upper end to the underside of cathode 2, as at 14. The welded or brazed connection 14 is employed because of the high operating temperature of cathode 2. A suitable adhesive 15 secures the opposite end of horn 13 to transducer 11 to establish efficient transmission of the vibration of transducer 11 to the cathode 2.

The ultrasonic vibrations transmitted via the horn 13 establish phonon waves in the cathode 2. Collisions occur between the phonon waves and the fields of the vibrating atoms and increase the energy level of the electrons slightly. An increased electron emission for a given emission heat input is obtained. Thus, ultrasonic vibration results in effectively lowering the cathode work function of the cathode surface which allows more electrons to escape and thereby increases the thermal efficiency of the cathode 2.

The transducer 11 is quite temperature sensitive and cooling means should normally be provided to reduce the heat transfer from cathode 2 through the horn 13. In the drawing, an in-line fuel coil 16 encircles the horn 13 to absorb the heat in the horn. The gas to burner 4 is thereby preheated and increases the burning efficiency.

The operation of the illustrated embodiment of the invention is summarized as follows:

The burner 4 is operated in a normal manner to heat the cathode 2 and establishes a thermally generated electron emission. The power supply 7 is set to establish a frequency in accordance with the natural frequency of cathode 2 for exciting of transducer 11.

The ultrasonic mechanical vibrations established by transducer 11 are amplified and transmitted by horn 13 to the cathode 2. The ultrasonic vibration of cathode 2 results in phonon waves in cathode 2 which through a collision phenomena increase the energy level of the electrons. Although the increase in energy level is generally quite small, the thermal energy from the burner 4 increases the energy level to approximately the barrier level and the slight increase is sufficient to raise many of the electrons above the barrier level.

By suitable control of the ultrasonic vibrator 6, the amount of power output of the thermionic converter 1 may be controlled. If the output of the ultrasonic vibrator 6 is increased, the output of the converter 1 correspondingly increases. Conversely, if the output of the ultrasonic vibrator 6 is reduced, the output of the thermionic converter 1 is proportionately reduced.

The present invention thus provides a thermionic generator including an ultrasonic vibration source for increasing and controlling the generator output.

Various modes of carrying out the invention are contemplated as being within the scope of the following claims particularly pointing out and distinctly claiming the subject matter which is regarded as the invention.

I claim:

1. In a thermionic current generator having an electron emitting cathode adapted to be heated to convert the heat energy into electrical energy, an ultrasonic vibration means having a sensitive area in effective contact with said cathode to radiate ultrasonic vibration waves to said cathode, and a heat source associated with the cathode and adapted to increase the cathode temperature to a thermally created electron emission level.

2. In a thermionic current generator, a plate-like cathode, an ultrasonic vibration source, and a coupling horn connecting the output of the vibration source to the cathode to radiate ultrasonic vibration waves into said cathode.

3. In a thermionic current generator, a cathode, an ultrasonic vibration source, a coupling horn connecting the output of the vibration source to the cathode to transmit ultrasonic vibrations to said cathode, a fuel burner mounted adjacent the cathode for heating the cathode, and means connected to the burner and adapted to be connected to a fuel source, said means serially including heat exchange means coupled to said horn to transmit the heat from the horn to the fuel in the heat exchange means.

References Cited in the file of this patent

UNITED STATES PATENTS

| | | |
|---|---|---|
| 1,955,396 | Unk et al. | Apr. 17, 1934 |
| 2,454,560 | Lafferty | Nov. 23, 1948 |